Oct. 2, 1956  R. A. STANG  2,765,457
CURRENT VISUAL INDICATOR
Filed May 18, 1955
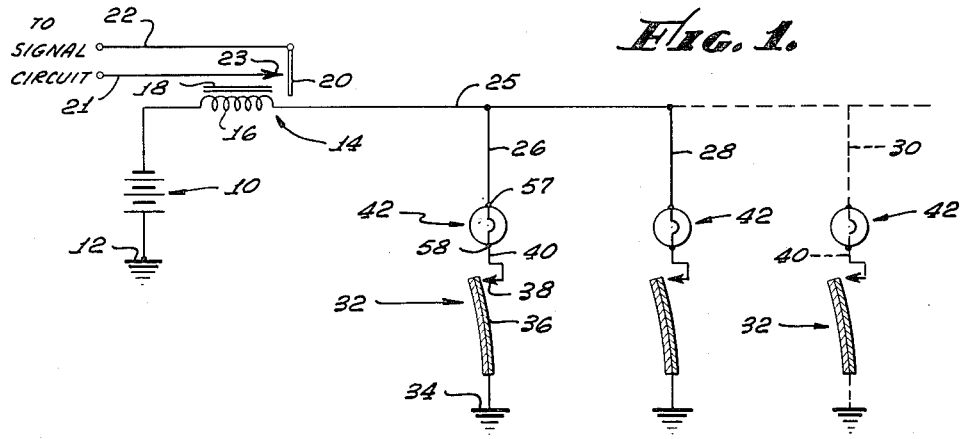
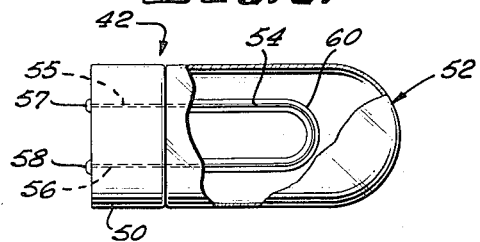 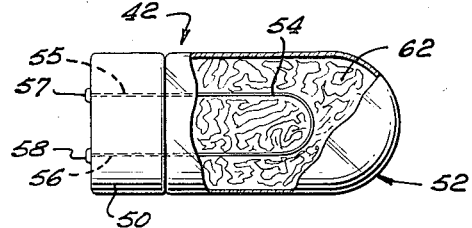
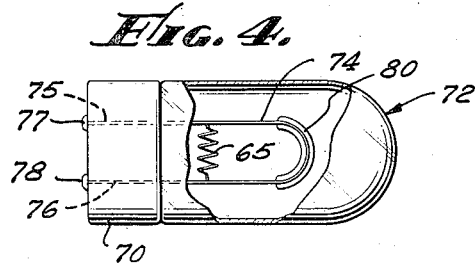 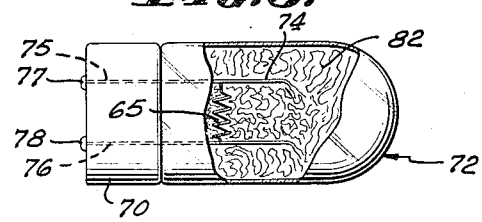
ROBERT A. STANG
INVENTOR.
BY
ATTORNEY.

United States Patent Office 2,765,457
Patented Oct. 2, 1956

2,765,457

CURRENT VISUAL INDICATOR

Robert Andrew Stang, North Hollywood, Calif., assignor to Walter Kidde & Company, Inc., Belleville, N. J., a corporation of New York Application May 18, 1955, Serial No. 509,200

1 Claim. (Cl. 340—253)

This invention relates generally to an indicator device for use in electrical circuits and more particularly describes such a device including an electrical conductor and a quantity of vaporizable material, the conductor and vaporizable material being housed within a hermetically sealed container. Leads are provided to the conductor for connection to an external circuit, and the device serves to indicate visually, by discoloration of its interior, the fact that current has passed therethrough exceeding some predetermined value.

The present device finds particular application in connection with a plurality of temperature indicating devices to be installed at predetermined critical locations in a mechanical apparatus such as an engine or the like. Although the invention will be described with reference to such use, it will be readily understood that it is not necessarily so limited and may be used in many different situations where it is desired that a permanent visual indication be made of the electrical history of a circuit. The device is intended to yield its visible signal upon flow of current therethrough exceeding a predetermined value, which may be zero, and the device is intended thereafter to be replaced.

In jet engines especially, and in other machines as well, optimum performance is attained at maximum temperatures permissible. These temperatures are normally set by metallurgical considerations and if exceeded will destroy or seriously damage the machine. It is therefore common practice to cause the machine to operate close to but slightly below the maximum temperatures obtaining at critical points spaced throughout the machine, and thermal sensing devices are positioned at such points. Typically the sensing devices are of the normally open type and a number of them—frequently ten or more—are connected in parallel so that the closing of any one of them serves to trigger a control or alarm circuit calling for immediate corrective action to be taken to overcome the malfunction causing excessive temperature. Such corrective action may, for example, include the automatic closing of high speed valves in the fuel supply line, as are well known in the art.

When an engine of new design is being developed, malfunctions may occur during operation giving rise to dangerously elevated temperatures. When such an engine has been provided with a number of parallel connected spaced thermal sensing elements, and actuation of any one of them serves to energize the signal or control circuit or otherwise to give the alarm indicating malfunction. However, when the engine is then brought to rest, it has heretofore frequently been impossible to quickly determine which one of as many as ten or more thermal sensing elements has experienced excessive temperature.

By the use of devices in accordance with the present invention, one of which is employed in series with each thermal sensing element used in a machine, the operator can immediately determine, after the engine has stopped, which one of an array of normally open, parallel connected thermal sensing elements has indicated an excessive temperature during operation by closing momentarily. The device of the present invention yields this information by reason of discoloration within its transparent envelope, and is intended to be discarded after it has served its indicating function by "firing." It is important that the electrical circuit through the device be continuous during and after the device has "fired."

Accordingly it is a principal object of the present invention to disclose a novel current visual indicator for use in an electrical circuit.

Another object of the invention is to provide visual indicating means of inexpensive construction by which to permanently indicate or signal the prior existence of an electrical current exceeding a predetermined value, even if such current is only momentary in duration.

A further object of the invention is to provide a device of the above character including a transparent hermetically sealed envelope and an electrical conductor and a quantity of vaporizable material within the envelope.

Other and allied objects and purposes of the invention will become clear to those skilled in the art from a study of the following description of preferred embodiments thereof, taken in connection with the accompanying drawing, in which:

Fig. 1 is a schematic layout of typical circuitry in which the present invention is used and including a plurality of thermal responsive elements connected in parallel with a signal relay.

Fig. 2 is a side elevational view of a device embodying one form of the present invention, with a portion of the glass envelope broken away;

Fig. 3 is a view similar to Fig. 2 showing the device after firing;

Fig. 4 is a side elevational view of a modified form of the invention with a portion of the glass envelope broken away; and Fig. 5 is a side elevational view of the device of Fig. 4 after firing.

Referring now in detail to the drawing, there is shown in Fig. 1 a schematic or diagrammatic layout of an electrical circuit including a number of spaced thermal sensing devices connected in parallel. Specifically the circuit includes a suitable source of electrical power such as a battery indicated generally at 10, one terminal of which may be grounded at 12. The output of the battery 10 is fed through a relay indicated generally at 14 and including a coil 16, an iron core 18 and a movable armature 20. Passage of current through the relay 14 is adapted to close the signal circuit including external leads 21 and 22 when the armature 20 is moved into contact with the point 23 in known manner.

The circuit including the relay 14 with its coil 16 continues in conductor 25 to a plurality of leads 26, 28, 30, etc., each connected to a temperature indicating circuit. These circuits are identical and they may be disposed at various spaced points in order that their thermal sensing element may respond to a critical temperature existing at some specific point in a machine such as an engine. The thermal sensing circuit 26 includes a thermal sensing element indicated generally at 32, one terminal of which is grounded at 34. The thermal sensing element 32 includes, exemplarily, a bimetallic strip 36 which is adapted to make contact with the point 38 upon the existence of an elevated temperature in the strip 36, all in a manner well known in the art. In series with the thermal sensing element 32 and connected thereto by conductor 40 is a current indicating device of the present invention, indicated generally at 42.

It will be readily understood that, the thermal sensing element 32 being normally open, an elevated temperature existing in the region of the bimetallic strip 36 results in the closing of the electrical contact 38 and sonsequent passage of electric current through the conductor 26 and the relay or signaling circuit 14. The bimetallic strip member 36 will be understood to be exemplary only of any of many thermal responsive elements, normally open, which might be incorporated into a circuit similar to Fig. 1 and by which the present invention may be effectively practiced.

The visual current indicator, indicated generally at 42, is seen in greater detail in the following figures of the drawing. Particularly in Fig. 2, the indicator 42 includes a base 50 of suitable dielectric material and a hollow envelope indicated generally at 52 fixed to and supported by the base 50. The envelope 52 includes a wall, at least a portion of which is transparent, and the entire envelope 52 may be made of glass or the like and thus be wholly transparent. Within the envelope 52 is an electrical conductor 54 provided with leads 55 and 56 hermetically sealed within the dielectric base member 50 and terminating outwardly in suitable contacts 57 and 58. These latter named contacts, as will be seen in Fig. 1, are connected to conductor 26 and conductor 40, respectively. Thus an electrical circuit is completed through the visual indicator 42, and the conductor 54 is spaced from the walls of envelope 52.

Within the envelope 52 there is a quantity of vaporizable solid material disposed in heat conductive relation with the electrical conductor 54. In the embodiment of the invention seen in Fig. 2, the vaporizable material is shown surrounding or coating the conductor 54 and is indicated at 60.

When current passes through the conductor 54, the temperature of the conductor virtually instantaneously attains the subliming temperature of the coating 60 thereon and the coating is thus caused to sublime or vaporize within the envelope 52 and then to condense on the inner wall of envelope 52, which is relatively cool. This condition is shown in Fig. 3, where the conductor 54 remains unaffected but the coating 60, by reason of the temperature attained by the conductor 54, is deposited on the inner surface of the envelope 52 as indicated at 62.

In certain instances the current flow to cause sublimation may also cause disintegration of breakage of the conductor on which the vaporizable coating is carried. In these instances an alternative form of the invention may be desired. Such an alternative form of the invention is shown in Figs. 4 and 5, wherein parts are indicated by reference numerals 20 greater than their counterparts in Figs. 2 and 3. Here the conductor 74, hermetically sealed within the envelope 72, is provided with an auxiliary shunting resistor 65, and the conductor 74 itself is of such construction as to permit its melting and consequent breakage at a high temperature when current passes therethrough. The conductor 74 bears a coating 80 of vaporizable material on a portion of its length. Similarly to the form of the invention shown in Figs. 2 and 3, the conductor 74 in Fig. 4 is provided with leads 75 and 76 extending through and hermetically sealed in a dielectric base member 70 and terminating outwardly in contacts 77 and 78 which correspond to contacts 57 and 58 of the embodiment shown in Figs. 2 and 3. The shunting resistor 65 remains unbroken after the device, as shown in Fig. 5, has "fired" as a result of current passing through the conductor 74 and the vaporizable material has been deposited on the interior wall of envelope 72. Hence the path of current through the device of Figs. 4 and 5 remains unbroken even after the device has served its indicating function. The resistance of shunting resistor 65 is desirably of the same order of magnitude as that of the conductor 74 itself.

Accordingly there is here provided a novel device for indicating the passage of current exceeding some predetermined value. As pointed out hereinabove, operation of the present invention contemplates that the vaporizable material which coats or is otherwise disposed in heat transfer relation with the electric conductor should sublime upon flow of current through the conductor exceeding a predetermined value. As is well known, sublimation occurs when the pressure is at or below the triple point of the material used, and is most easily achieved in the case of solids having relatively high vapor pressures. Such materials include, for example, cobalt chloride, naphthalene, benzoic acid and others including certain elements such as iodine and sulfur. It will be readily seen that the physical and chemical constants and dimensions of the conductors 54 or 74 may be so chosen as to permit the passage of current of any desired value before the respective conductor reaches the necessary temperature to cause sublimation or vaporization of the coating thereon. The interior of the envelope 52 or 72 is partially evacuated to permit sublimation of the material used at the temperature attained when a current of predetermined value passes through the instrument.

Modifications and changes from the specific forms shown are within the contemplation of the present invention and are intended to be embraced within the scope of the following claim.

I claim:

An indicator for current flow comprising: a sealed hollow rigid envelope at least a portion of which is transparent; an electric conductor within the envelope having terminals extending outside the envelope; a shunting resistor in parallel with said conductor; and a quantity of vaporizable material in heat transfer relation with the conductor.

References Cited in the file of this patent

UNITED STATES PATENTS

| | | |
|---|---|---|
| 925,064 | Whitney | June 15, 1909 |
| 1,746,363 | Schleicher | Feb. 11, 1930 |
| 2,562,434 | Oram | July 31, 1951 |

FOREIGN PATENTS

| | | |
|---|---|---|
| 138,756 | Great Britain | Feb. 19, 1920 |